(12) United States Patent
Nanda et al.

(10) Patent No.: US 12,170,931 B1
(45) Date of Patent: Dec. 17, 2024

(54) ROUTE TRACKING OVERLAPPING GEOFENCES

(71) Applicant: Samsara Inc., San Francisco, CA (US)

(72) Inventors: Sachal Nanda, San Francisco, CA (US); Sean McGee, San Francisco, CA (US); Alex Wu, San Francisco, CA (US); Tirso Peguero, San Francisco, CA (US); Emily White, Long Beach, CA (US); Eric Shreve, San Francisco, CA (US); Wei Wu, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 365 days.

(21) Appl. No.: 17/647,795

(22) Filed: Jan. 12, 2022

Related U.S. Application Data

(63) Continuation of application No. 17/302,583, filed on May 6, 2021, now abandoned.

(51) Int. Cl.
*H04W 4/021* (2018.01)
*G08G 1/00* (2006.01)
*G08G 1/127* (2006.01)

(52) U.S. Cl.
CPC ............ *H04W 4/021* (2013.01); *G08G 1/127* (2013.01); *G08G 1/20* (2013.01)

(58) Field of Classification Search
None
See application file for complete search history.

(56) References Cited

U.S. PATENT DOCUMENTS

| | | | |
|---|---|---|---|
| 2020/0258018 A1* | 8/2020 | Brady | G06Q 30/0645 |
| 2021/0182787 A1* | 6/2021 | Mouli | G06Q 10/0838 |

* cited by examiner

*Primary Examiner* — Frantz Bataille
(74) *Attorney, Agent, or Firm* — Schwegman Lundberg & Woessner, P.A.

(57) ABSTRACT

Disclosed are systems, methods, and non-transitory computer-readable media for route tracking overlapping geofences. A route management system provides for route tracking of overlapping geofences. For example, the route management system tracks the amount of time that a vehicle is within geofence, even when the vehicle has not departed a previous scheduled stop and/or is within multiple overlapping geofences. The route management system determines that the vehicle has arrived at the scheduled stop when the amount of time that the vehicle has been within the geofence encompassing the scheduled stop meets a threshold period of time. As a result, the route management system accurately logs a vehicle as having arrived at multiple scheduled stops that have overlapping geofences.

20 Claims, 10 Drawing Sheets

ROUTE TRACKING OVERLAPPING GEOFENCES

PRIORITY APPLICATION

This application is a continuation of U.S. patent application Ser. No. 17/302,583, filed May 6, 2021, the disclosure of which is incorporated by reference herein in its entirety.

TECHNICAL FIELD

Embodiments of the present subject matter relate generally to vehicles and, more specifically, to route tracking overlapping geofences.

BACKGROUND

Fleet managers track the movement of their vehicles to ensure that they are operating as expected. For example, fleet managers may track whether a vehicle began a route at an expected time, arrived at scheduled stops along the route, and completed the route. This process is often performed manually, however systems have been developed to automate this process. These systems utilize geofences to determine when a vehicle has arrived and/or departed a scheduled stop. In some cases, a vehicle may be scheduled to stop at multiple locations that are within a proximity of each other. For example, a delivery truck may be scheduled to deliver packages at multiple stores located in the same shopping center. This creates an issue when tracking vehicles as the geofences associated with multiple stops may be overlapping. As a result, current systems may not track that the vehicle stopped at each stop and/or determine that the vehicle performed the scheduled stops in an incorrect order. Accordingly, improvements are needed.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
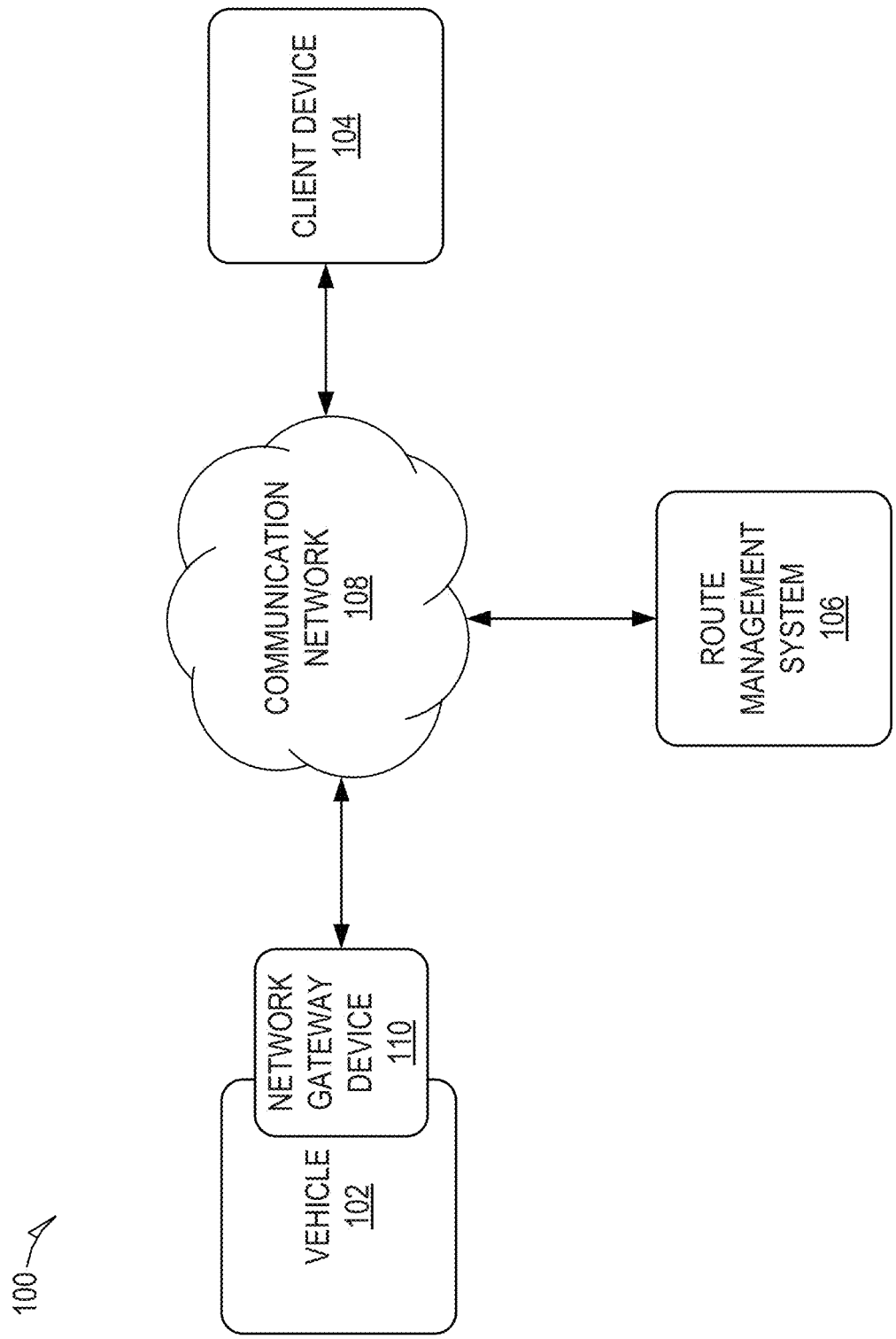
FIG. 1 shows a system for route tracking overlapping geofences, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for route tracking overlapping geofences. A route management system provides for automated fleet tracking. For example, the route management system enables fleet managers to define and assign routes for vehicles in a fleet. A route may be defined based on a set of route variables that describe the route. For example, the set of route variables may include a beginning and ending location of the route, scheduled stops along the route, an order at which the vehicle is to stop at each scheduled stop, a scheduled beginning and ending time of the route, a scheduled arrival and departure time at the scheduled stops, and the like.

The route management system uses the set of route variables defining each route along with sensor data describing the geographic location and/or movement of the vehicles to generate route tracking reports. A route tracking report is a file or document that includes data indicating the movement of a vehicle in relation to its assigned route. For example, the route tracking report may indicate whether a vehicle began and/or ended its route on time, arrived at each of its scheduled stops, arrived and/or departed from each scheduled stop on time, completed the route in the correct order, and the like.

Geofences are used to determine when vehicles have arrived and/or departed from scheduled stops along a route. A geofence is a virtual perimeter for a real-world geographic area. Geofences are established to encompass each scheduled stop along a route. The route management system uses the geofences along with location data describing the current location of the vehicles to determine whether the vehicles have arrived and/or departed the scheduled stops. For example, the route management system may determine that a vehicle has arrived at a scheduled stop if the current location of the vehicle has been within the geofence encompassing the scheduled stop for a threshold period of time.

Similarly, the route management system may determine that the vehicle has departed the scheduled stop if the current location of the vehicle is subsequently outside of the geofence encompassing the scheduled stop for another threshold period of time.

As explained earlier, problems arise with current systems when multiple scheduled stops are within a proximity of each other. Current systems track arrivals and departures in sequential order such that a vehicle cannot arrive at multiple scheduled stops at once. For example, a vehicle cannot arrive at a scheduled stop until the vehicle has been determined to have departed its previous scheduled stop. Geofences encompassing multiple scheduled stops within a proximity may be overlapping. As a result, the location of a vehicle may fall within multiple geofences encompassing different scheduled stops. Current system may not register that the vehicle has arrived at each of the scheduled stops as the vehicle has not successfully departed the previous scheduled stop. Similarly, current systems my register the vehicle as having registered at the scheduled stops in an incorrect order because the vehicle is within multiple geofences.

To alleviate this issue, the route management system provides for route tracking of overlapping geofences. For example, the route management system tracks the amount of time that a vehicle is within geofence, even when the vehicle has not departed a previous scheduled stop and/or is within multiple overlapping geofences. The route management system determines that the vehicle has arrived at the scheduled stop when the amount of time that the vehicle has been within the geofence encompassing the scheduled stop meets a threshold period of time. As a result, the route management system accurately logs a vehicle as having arrived at multiple scheduled stops that have overlapping geofences.

The route management system may utilize prompts to confirm the order in which a vehicle arrived and/or departed from the scheduled stops. For example, route management system may send a notification to an operator of a vehicle that is located within multiple geofences that prompts the vehicle operator to indicate whether they have arrived and/or departed a scheduled stop, confirm the order in which they arrived and/or departed the scheduled stops, and the like. The notification may enable the vehicle operator to provide the requested information to the route management system.

FIG. 1 shows a system 100 for route tracking overlapping geofences. As shown, multiple devices (i.e., vehicle 102, client device 104, and route management system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1000 shown in FIG. 10.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The vehicle 102 may be any type of vehicle, such as an automobile, semi-trailer truck, plane, bus, train, ship, and the like. As shown, the vehicle 102 includes a network gateway device 110 (e.g., vehicle gateway) that allows for remote communication between the vehicle 102 and one or more remote computing devices via the communication network 108.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs), actuators, etc., deployed within the vehicle 102. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device. The vehicle 102 may be equipped with a variety of sensors that capture data describing performance of a vehicle 102 and its surroundings. For example, the sensors may include engine speed sensors, fuel temperature sensors, voltage sensors, pressure sensors, radar sensors, light detection and ranking (LIDAR) sensors, imaging sensors (e.g., camera, video camera), and the like.

The route management system 106 is one or more computing devices that allow for generation and management of routes as well as automated route tracking. For example, the route management system 106 may allow administrators to generate routes and assign the generated routes to vehicles 102. The route management system 106 may also provide automated route tracking of the vehicles 102 based on the assigned routes.

To utilize the functionality of the route management system 106, users (e.g., fleet managers) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles 102. Further, the route management system 106 may concurrently accept communications from and initiate communication messages and/or interact with any number of client devices 104 and vehicles 102, and support connections from a variety of different types of client devices 104, such as desktop computers; mobile computers; mobile communications devices, e.g., mobile phones, smart phones, tablets; smart televisions; set-top boxes; and/or any other network enabled computing devices. Hence, the client devices 104 may be of varying type, capabilities, operating systems, and so forth.

A user interacts with a route management system 106 via a client-side application installed on the client device 104. In some embodiments, the client-side application includes a component specific to the route management system 106. For example, the component may be a stand-alone application, one or more application plug-ins, and/or a browser extension. However, the users may also interact with the route management system 106 via a third-party application, such as a web browser or messaging application, that resides on the client device 104 and is configured to communicate with the route management system 106. In either case, the client-side application presents a user interface (UI) for the user to interact with the route management system 106. For example, the user interacts with the route management system 106 via a client-side application integrated with the file system or via a webpage displayed using a web browser application.

As discussed earlier, the route management system 106 enables fleet managers to generate and track vehicle routes. For example, the route management system 106 may provide a user interface that allows fleet managers to generate vehicle routes. A vehicle route is a route to be traversed by a vehicle 102 that is defined by a set of route variables. For example, the set of route variables may include a beginning and ending geographic location of the route, scheduled geographic stops along the route, an order at which the vehicle 102 is to stop at each scheduled stop, a scheduled beginning and ending time of the route, a scheduled arrival and departure time at the scheduled stops, and the like.

The user interface provided by the route management system 106 enables fleet managers to select the set of route variables to define a route. For example, the user interface may provide a listing of geographic locations and times that a fleet manager may select from to define a route. A fleet manager may use the user interface to select geographic locations to be includes in the route, such as a beginning location, end location, and scheduled stops, as well as select an order in which the geographic locations are to be traversed along the route. The user interface may also enable a fleet manager to assign times to the selected geographic locations, such as scheduled start time, arrival time, and/or departure time for each.

The user interface may also enable fleet managers to assign the generated routes to individual vehicles 102 and/or vehicle operators. For example, the user interface may present a listing of individual vehicles 102 and/or vehicle operators from which the fleet manager may select. As another example, the user interface may enable an administrator to enter data identifying a vehicle 102 or vehicle operator, as well as enter a new vehicle 102 or vehicle operator.

The route management system 106 provides for automated tracking of the vehicles 102 based on the routes assigned by the fleet manager. For example, the route management system 106 receives sensor data describing the location and/or motion of the vehicle 102, which the route management system 106 uses to track location of the vehicle 102. The sensor data may be received from the vehicle 102 and/or from a client device 104 of the vehicle operator.

The route management system 106 uses the set of route variables defining a route along with the sensor data describing the geographic location and/or movement of the vehicle 102 to generate a route tracking report describing the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like.

The route management system 106 uses geofences to determine when vehicles 102 have arrived and/or departed from scheduled stops along a route. A geofence is a virtual perimeter for a real-world geographic area. Geofences are established to encompass each scheduled stop along a route. The route management system 106 uses the geofences along with location data describing the current location of the vehicles 102 to determine whether the vehicles 102 have arrived and/or departed the scheduled stops. For example, the route management system 106 may determine that a vehicle 102 has arrived at a scheduled stop if the current location of the vehicle 102 has been within the geofence encompassing the scheduled stop for a threshold period of time. Similarly, the route management system 106 may determine that the vehicle 102 has departed the scheduled stop if the current location of the vehicle 102 is subsequently outside of the geofence encompassing the scheduled stop for another threshold period of time.

As explained earlier, problems arise with current systems when multiple scheduled stops are within a proximity of each other. Current systems track arrivals and departures in sequential order such that a vehicle 102 cannot arrive at multiple scheduled stops at once. For example, current system will not log a subsequent arrival until a vehicle 102 has been determined to have departed its previous scheduled stop. Geofences encompassing multiple scheduled stops within a proximity may be overlapping. As a result, the location of a vehicle 102 may fall within multiple geofences encompassing different scheduled stops. Current systems may not register that the vehicle 102 has arrived at each of the scheduled stops as the vehicle 102 has not successfully departed the previous scheduled stop. Similarly, current systems my register the vehicle 102 as having registered at the scheduled stops in an incorrect order because the vehicle 102 is within multiple geofences.

To alleviate this issue, the route management system 106 provides for route tracking of overlapping geofences. For example, the route management system 106 tracks the amount of time that a vehicle 102 is within geofence, even when the vehicle 102 has not departed a previous scheduled stop and/or is within multiple overlapping geofences. The route management system 106 determines that the vehicle 102 has arrived at the scheduled stop when the amount of time that the vehicle 102 has been within the geofence encompassing the scheduled stop meets a threshold period of time. As a result, the route management system 106 accurately logs a vehicle 102 as having arrived at multiple scheduled stops that have overlapping geofences.

The route management system 106 may utilize prompts to confirm the order in which a vehicle 102 arrived and/or departed from the scheduled stops. For example, route management system 106 may send a notification to the client device 104 of an operator of a vehicle 102 that is located within multiple geofences. The notification prompts the vehicle operator to indicate whether they have arrived and/or departed a scheduled stop, confirm the order in which they arrived and/or departed the scheduled stops, and the like. The notification may enable the vehicle operator to provide the requested information to the route management system 106. For example, the notification may include user interface elements (e.g., buttons, text fields) that the vehicle operator may use to enter the requested information. The client device 104 may then return the requested information to the route management system 106.

Figure 2:
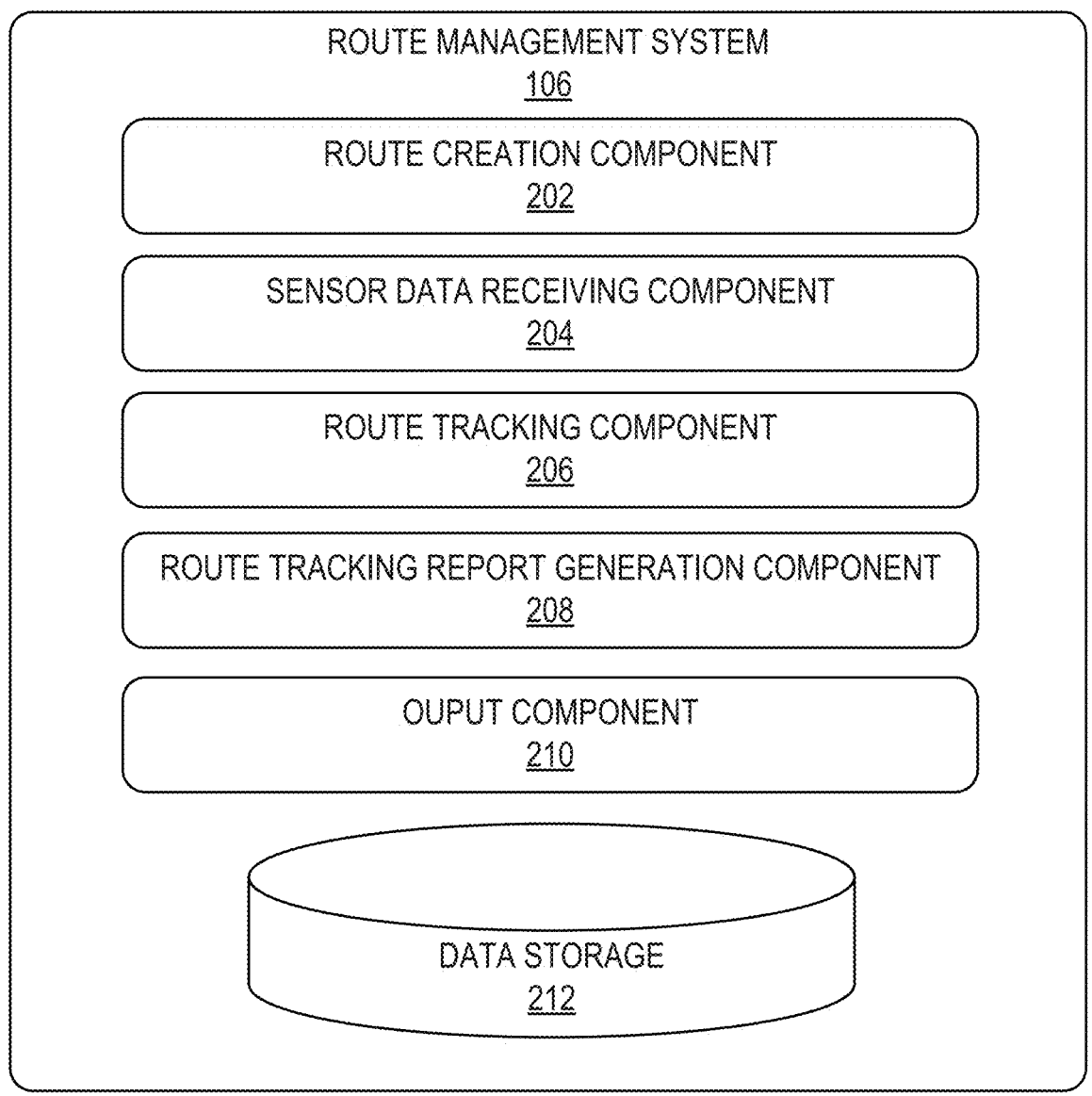
FIG. 2 is a block diagram of the route management system, according to some example embodiments.

FIG. 2 is a block diagram of the route management system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the route management system 106 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the route management system 106 includes a route creation component 202, a sensor data receiving component 204, a route tracking component 206, a route tracking report generation component 208, an output component 210, and a data storage 212.

The route creation component 202 enables fleet managers to generate routes and assign routes to vehicles 102. For example, the route creation component 202 may provide a user interface that allows fleet managers to generate vehicle routes. A vehicle route is a route to be traversed by a vehicle 102 that is defined by a set of route variables. For example, the set of route variables may include a beginning and ending geographic location of the route, scheduled geographic stops along the route, an order at which the vehicle 102 is to stop at each scheduled stop, a scheduled beginning and ending time of the route, a scheduled arrival and departure time at the scheduled stops, and the like.

The user interface provided by the route creation component 202 enables fleet managers to select the set of route variables for a route. For example, the user interface may provide a listing of geographic locations and times that a fleet manager may select from to define a route. A fleet manager may use the user interface to select geographic locations to be includes in the route, such as a beginning location, end location, and scheduled stops, as well as select an order in which the geographic locations are to be traversed along the route. The user interface may also enable a fleet manager to assign times to the selected geographic locations, such as scheduled start time, arrival time, and/or departure time for each.

The user interface may also enable fleet managers to assign the generated routes to individual vehicles 102 and/or vehicle operators. For example, the user interface may present a listing of individual vehicles 102 and/or vehicle operators from which the fleet manager may select. As another example, the user interface may enable an administrator to enter data identifying a vehicle 102 or vehicle operator, as well as enter a new vehicle 102 or vehicle operator.

The route creation component 202 stores data defining the created routes in the data storage 212, where it can be accessed by other components of the route management system 106. For example, the data stored in the data storage 212 may be associated with an account of the route management system 106 and/or specific vehicles 102 to which the route has been assigned.

The sensor data receiving component 204 receives sensor data used to provide automated route tracking. For example, the sensor data receiving component 204 receives sensor data describing the location and/or motion of a vehicle 102. The sensor data may be received from the vehicle 102 and/or from a client device 104 of the vehicle operator that is operating the vehicle 102.

The route tracking component 206 provides for automated tracking of the vehicles 102. The route tracking component 206 uses the set of route variables defining a route along with the sensor data received by the sensor data receiving component 204 to track the vehicle's 102 movement along its assigned route. This includes determining a current status (e.g., location) of the vehicle 102, whether the vehicle 102 has arrived at scheduled stops, departed from scheduled stops, and the like.

The route tracking component 206 uses geofences to determine when vehicles 102 have arrived and/or departed from scheduled stops along a route. A geofence is a virtual perimeter for a real-world geographic area. Geofences are established to encompass each scheduled stop along a route. The route tracking component 206 uses the geofences along with location data describing the current location of the vehicles 102 to determine whether the vehicles 102 have arrived and/or departed the scheduled stops. For example, the route tracking component 206 may determine that a vehicle 102 has arrived at a scheduled stop if the current location of the vehicle 102 has been within the geofence encompassing the scheduled stop for a threshold period of time. Similarly, the route tracking component 206 may determine that the vehicle 102 has departed the scheduled stop if the current location of the vehicle 102 is subsequently outside of the geofence encompassing the scheduled stop for another threshold period of time.

As explained earlier, problems arise with current systems when multiple scheduled stops are within a proximity of each other. Current systems track arrivals and departures in sequential order such that a vehicle 102 cannot arrive at multiple scheduled stops at once. For example, current system will not log a subsequent arrival until a vehicle 102 has been determined to have departed its previous scheduled stop. Geofences encompassing multiple scheduled stops within a proximity may be overlapping. As a result, the location of a vehicle 102 may fall within multiple geofences encompassing different scheduled stops. Current systems may not register that the vehicle 102 has arrived at each of the scheduled stops as the vehicle 102 has not successfully departed the previous scheduled stop. Similarly, current systems my register the vehicle 102 as having registered at the scheduled stops in an incorrect order because the vehicle 102 is within multiple geofences.

To alleviate this issue, the route tracking component 206 provides for route tracking of overlapping geofences. For example, the route tracking component 206 begins tracking the amount of time that a vehicle 102 is within geofence, even when the vehicle 102 has not departed a previous scheduled stop and/or is within multiple overlapping geofences. The route tracking component 206 determines that the vehicle 102 has arrived at the scheduled stop when the amount of time that the vehicle 102 has been within the geofence encompassing the scheduled stop meets a threshold period of time. As a result, the route tracking component 206 accurately logs a vehicle 102 as having arrived at multiple scheduled stops that have overlapping geofences.

The route tracking component 206 may also utilize prompts to confirm the order in which a vehicle 102 arrived and/or departed from the scheduled stops. For example, route tracking component 206 may send a notification to the client device 104 of an operator of a vehicle 102 that is located within multiple geofences. The notification prompts the vehicle operator to indicate whether they have arrived and/or departed a scheduled stop, confirm the order in which they arrived and/or departed the scheduled stops, and the like. The notification may enable the vehicle operator to provide the requested information to the route management system 106. For example, the notification may include user interface elements (e.g., buttons, text fields) that the vehicle operator may use to enter the requested information. The client device 104 may then return the requested information to the route management system 106

The route tracking report generation component 208 generates a route tracking report based on the route tracking performed by the route tracking component 206. The route tracking report describes the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like.

The output component 210 provides the route tracking report to a fleet manager or other user. For example, the output component 210 may transmit the route tracking report to the client device 104 of a fleet manager or other user via email, text message, and the like. As another example, the output component 210 may provide the route tracking report within a user interface that can be accessed by a fleet manager. For example, a fleet manager may use a client device 104 to interact with the route management system 106 to and access the user interface provided by the output component 210.

The output component 210 may also transmit notifications based on the data included in a route tracking report. For example, the output component 210 may transmit a notification to a client device 104 of a vehicle operator indicating that the vehicle operator has missed a scheduled stop, is behind schedule, is not following the correct route, and the like. Similarly, the output component 210 may transmit a notification to a client device 104 of a fleet manager or other user to provide status updates associated with a route, such as the vehicle 102 having started at a route, arriving at a scheduled stop, left a scheduled stop, missed a scheduled stop, completed the route, and the like.

Figure 3:
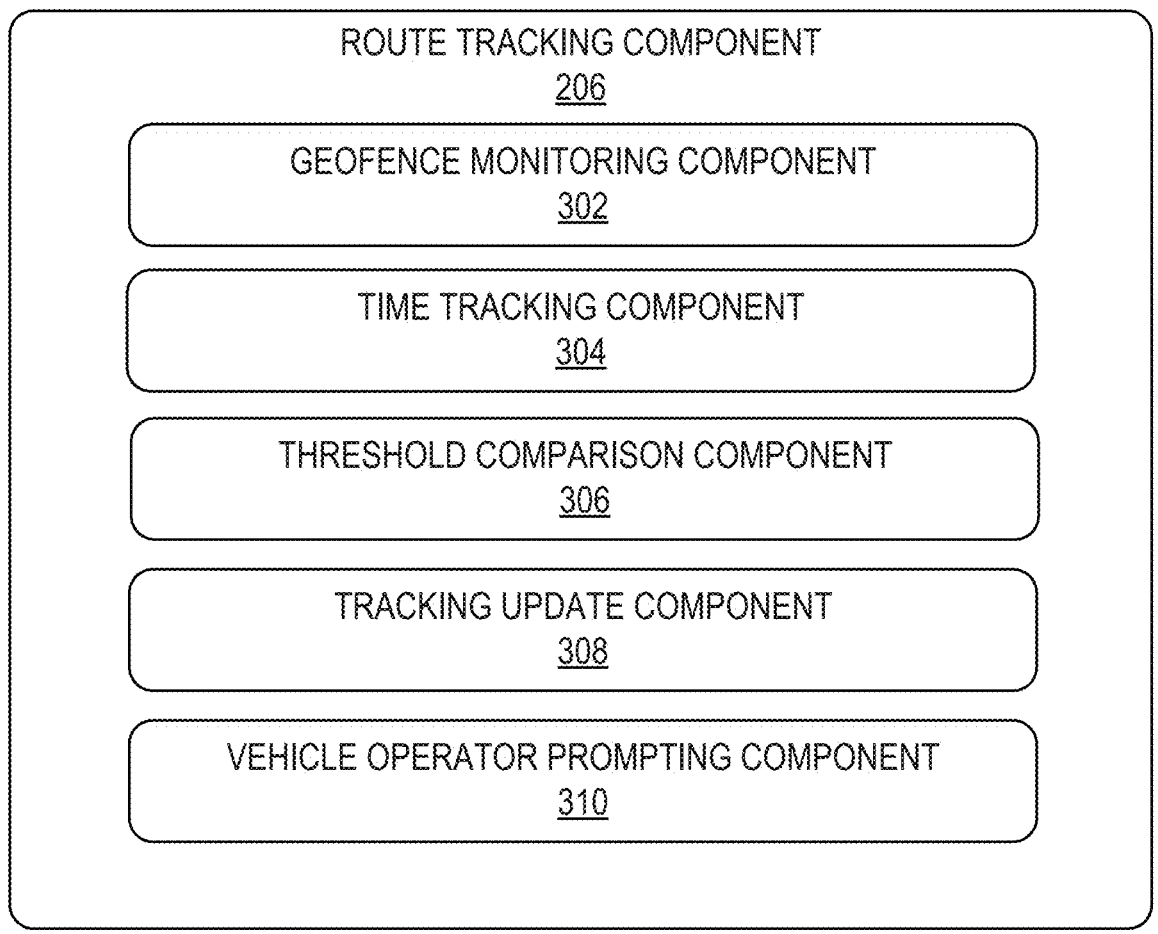
FIG. 3 is a block diagram of the route tracking component, according to some example embodiments.

FIG. 3 is a block diagram of the route tracking component 206, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the route tracking component 206 to facilitate additional functionality that is not specifically described herein. Furthermore, the various functional components depicted in FIG. 3 may reside on a single computing device or may be distributed across several computing devices in various arrangements such as those used in cloud-based architectures.

As shown, the route tracking component 206 includes a geofence monitoring component 302, a time tracking component 304, a threshold comparison component 306, a tracking update component 308, and a vehicle operator prompting component 310.

The geofence monitoring component 302 monitors the location of vehicles 102 in relation to geofences encompassing schedules stops. For example, the geofence monitoring component 302 uses sensor data received by the sensor data receiving component 204 to determine the current location of vehicles 102. The geofence monitoring component 302 may access data from the data storage 212 that defines the schedules stops along the route assigned to the vehicle 102, as well as data defining the geofences encompassing the scheduled stops. The geofence monitoring component 302 uses this data to determine whether the current location of a vehicle 102 is within and/or outside of any geofences along a route assigned to the vehicle 102.

The geofence monitoring component 302 maintain a status of each vehicle 102 indicating whether the vehicle 102 is within any of the geofences. For example, the status may be stored in the data storage 212. The geofence monitoring component 302 may update the status of each vehicle 102 as the vehicle 102 is determined to have changed status, such as by entering or exiting a geofence. The status of a vehicle 102 may indicate that a vehicle 102 is concurrently within multiple geofences. For example, the status of a vehicle 102 that is within overlapping portions of multiple geofences will indicate that the vehicle 102 is within each of the geofences.

The status associated with each vehicle 102 may also indicate a time at which the change in status was detected or occurred. For example, the geofence monitoring component 302 may attach a timestamp to the status to indicate the time at which the vehicle 102 was determined to have entered or exited a specified geofence. The status of a vehicle 102 may be accessed by the other components of the route management system 106. Further, the geofence monitoring component 302 may notify other components of the route management system 106 when a vehicle's 102 status has changed. For example, the geofence monitoring component 302 may notify the time tracking component 304 that a vehicle's 102 status has changed by either entering or exiting a geofence encompassing a scheduled stop.

The time tracking component 304 tracks a period of time that has elapsed after the status of a vehicle 102 has changed. For example, the time tracking component 304 may track the amount of time that has elapsed after a vehicle 102 has entered a geofence or exited a geofence. The elapsed time is used to determine whether the vehicle 102 has arrived or departed from a scheduled stop encompassed by the geofence. For example, a vehicle 102 may be determined to have arrived at a scheduled stop after the vehicle 102 has been within the geofence for a threshold period of time. Similarly, a vehicle 102 may be determined to have departed a scheduled stop after the vehicle 102 has been outside of the geofence for a threshold period of time. The threshold period of times used to determine whether a vehicle 102 has arrived or departed a scheduled stop may be the same length or different lengths.

The threshold comparison component 306 determines whether the period of elapsed time that a vehicle 102 has entered or exited a geofence meets the appropriate threshold period of time. For example, the threshold comparison component 306 compares the period of time that has elapsed after a vehicle 102 has entered a geofence to the threshold period of time for determining that a vehicle 102 has arrived at a scheduled stop. Similarly, the threshold comparison component 306 compares the period of time that has elapsed after a vehicle 102 has exited a geofence to the threshold period of time for determining that a vehicle 102 has departed a scheduled stop.

In the event that the elapsed period of time meets the threshold period of time, the threshold comparison component 306 notifies the tracking update component 308. For example, the threshold comparison component 306 provides the tracking update component 308 with data identifying the vehicle 102 and the geofence. In turn, the tracking update component 308 updates the route tracking report generation component 208. For example, the tracking update component 308 updates the route tracking report generation component 208 that the vehicle 102 has either arrived at or departed the scheduled stop encompassed by the geofence.

The vehicle operator prompting component 310 transmits prompts to a vehicle operator to confirm whether a vehicle 102 has arrived or departed a scheduled stop and/or to confirm the order in which the vehicle 102 arrived and/or departed from the scheduled stops. For example, the vehicle operator prompting component 310 may send a notification to the client device 104 of an operator of a vehicle 102 when the vehicle 102 is within overlapping geofences.

The notification can include a message asking the vehicle operator to confirm whether the vehicle 102 has arrived and/or departed a scheduled stop, confirm the order in which they arrived and/or departed the scheduled stops, and the like. The notification may also enable the vehicle operator to provide the requested information to the route management system 106. For example, the notification may include user interface elements (e.g., buttons, text fields) that the vehicle operator may use to enter the requested information. The client device 104 may then return the requested information to the route management system 106.

The vehicle operator prompting component 310 may update the tracking update component 308 based on the information received from the vehicle operator. In the turn, the tracking update component 308 may update the route tracking report generation component 208 based on the information. For example, tracking update component 308 may update the route tracking report generation component 208 if information indicates that the vehicle 102 has either arrived at or departed a scheduled stop.

Figure 4:
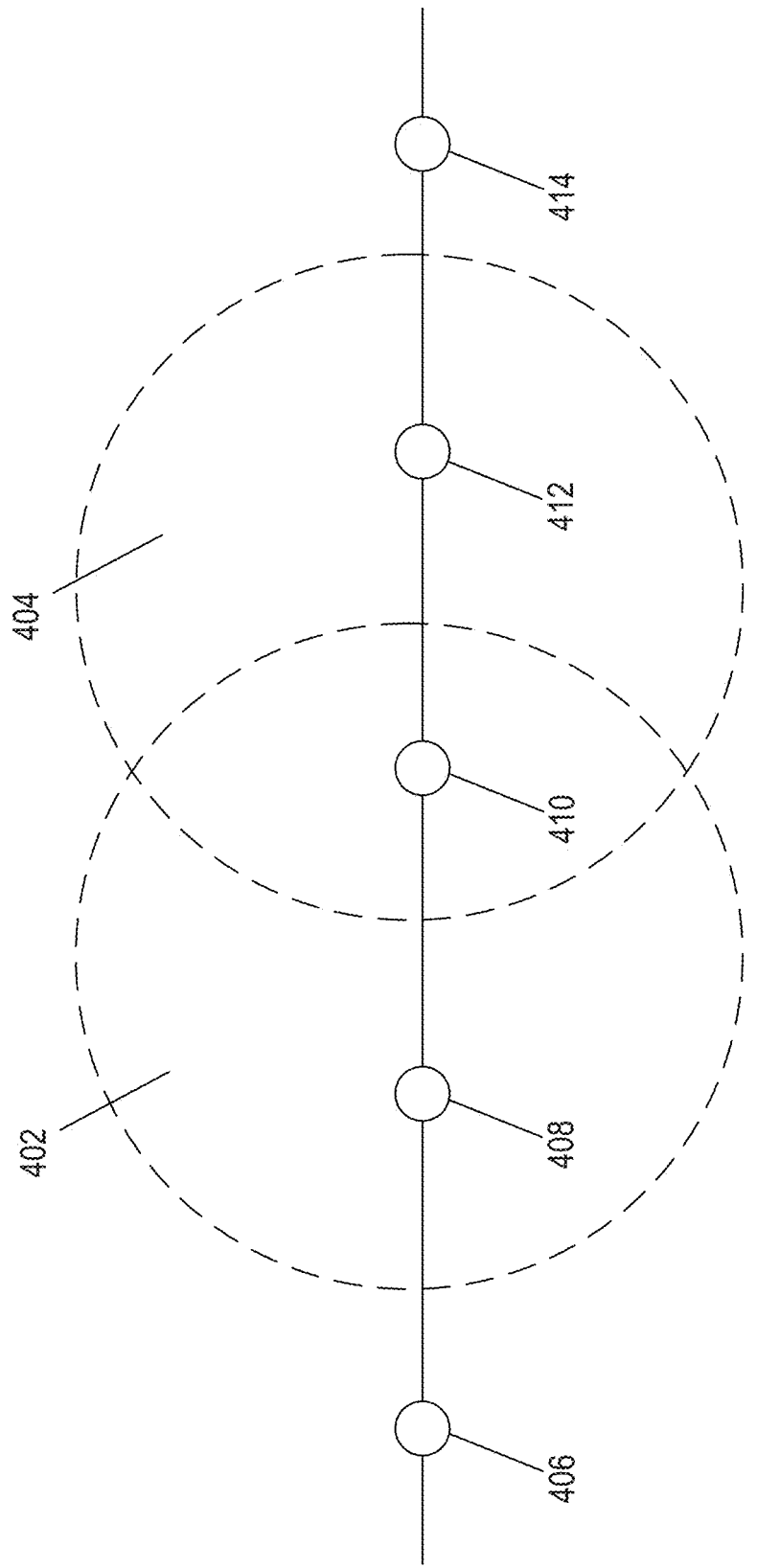
FIG. 4 illustrates route tracking overlapping geofences, according to some example embodiments.

FIG. 4 illustrates route tracking overlapping geofences, according to some example embodiments. FIG. 4 is described below by way of example with reference to the route management system 106.

As shown, two geofences 402, 404 overlap with each other. Each geofence 402, 404 encompasses a scheduled stop along a route. A vehicle 102 traversing the route may initially be located at a first location 406 that is outside of both of the geofences 402, 404. The geofence monitoring component 302 tracks the location of the vehicle 102 as the vehicle 102 travels to a second location 408 that falls within the first geofence 402. In response to determining that the vehicle 102 has moved from the first location 406 to the second location 408 that is within the first geofence 402, the time tracking component 304 begins tracking the period of time that the vehicle 102 has been within the first geofence 402. If the threshold comparison component 306 determines that the period of time that the vehicle 102 has been within the first geofence 402 meets a threshold period of time, the tracking update component 308 updates the route tracking report to indicate that the vehicle 102 has arrived at the first scheduled stop encompassed by the first geofence 402.

As shown, the third location 410 falls within an overlapping portion of the first geofence 402 and the second geofence 404. Accordingly, the vehicle 102 will be within both geofences 402, 404 when it arrives at the third location 410, meaning that the vehicle 102 has entered the second geofence 404 without having departed the first scheduled stop encompassed by the first geofence 402. To track the vehicle's arrival at both scheduled stops, the time tracking component 304 begins tracking the period of time that the vehicle 102 has been within the second geofence 404 when the vehicle 102 enters the second geofence 404. The time tracking component 304 begins tracking the period of time that the vehicle 102 has been within the second geofence 404 even though the vehicle 102 has not yet departed the first scheduled stop.

The vehicle 102 may be determined to have arrived at the second scheduled stop encompassed by the second geofence 404 if the period of time that the vehicle 102 has been within the second geofence 404 meets a threshold period of time for arriving at a scheduled stop. In some embodiments, the route tracking component 206 can determine that the vehicle 102 has arrived at the second scheduled stop encompassed by the second geofence 404 prior to the vehicle 102 having departed the first scheduled stop encompassed by the first geofence 402. For example, the route tracking component 206 can determine that a vehicle 102 that has been at the third location 410 for the threshold period of time has arrived at the second scheduled stop encompassed by the second geofence 404.

Alternatively, in some embodiments, the route tracking component 206 determines that the vehicle 102 arrived at the second scheduled stop encompassed by the second geofence 404 after the vehicle 102 is determined to have departed the first scheduled stop encompassed by the first geofence 402. That is, the route tracking component 206 determines that the vehicle 102 has arrived at the second scheduled stop when the elapsed time that the vehicle 102 has been within the second geofence 404 meets the threshold period of time and the vehicle 102 has departed the first scheduled stop.

Figure 5:
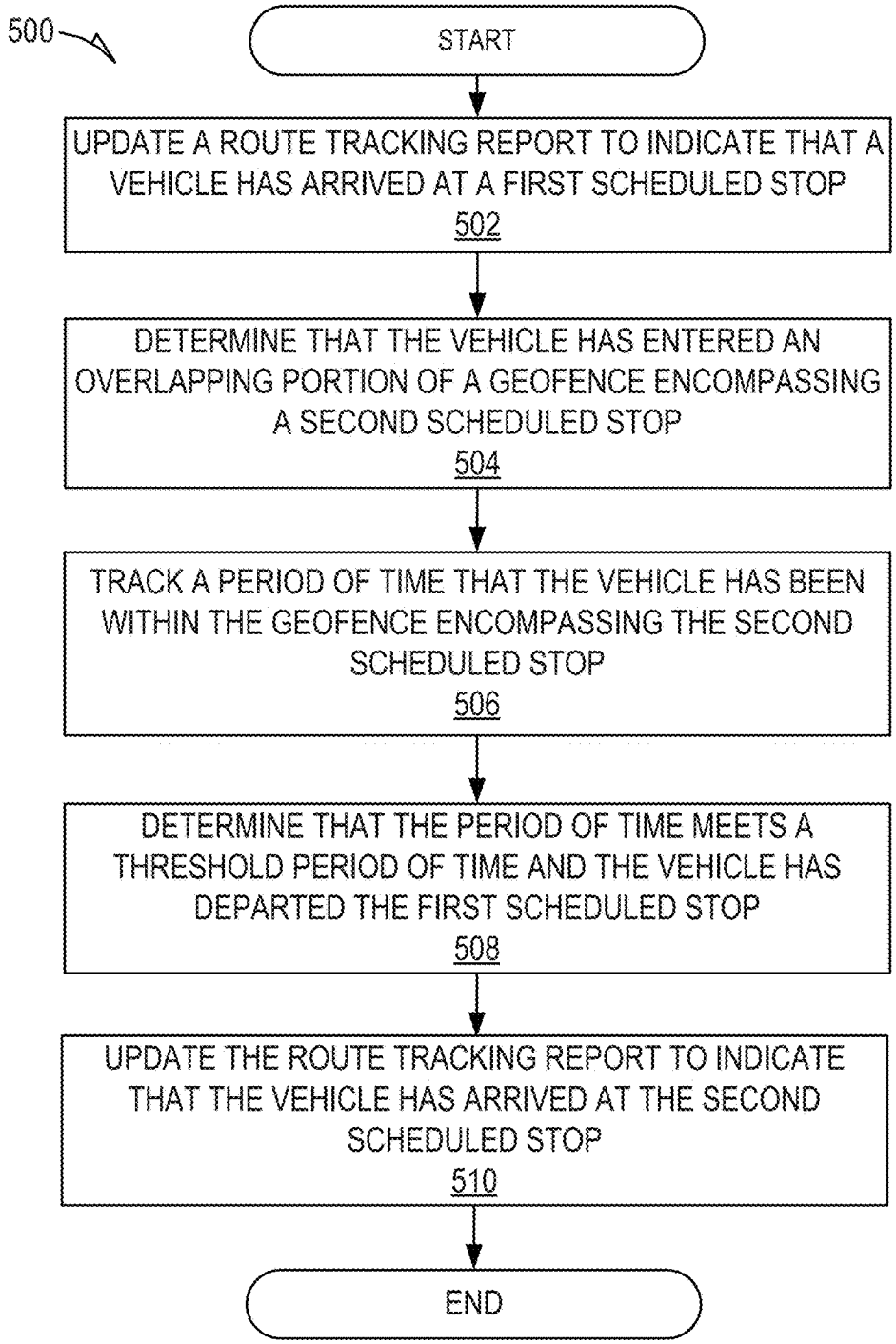
FIG. 5 is a flowchart showing a method for route tracking overlapping geofences, according to some example embodiments.

The route tracking component 206 may determine that the vehicle 102 has departed the first scheduled stop in multiple ways. For example, the vehicle operator prompting component 310 may prompt the vehicle operator of the vehicle 102 to provide data indicating whether the vehicle 102 has departed the first scheduled stop. As another example, the route tracking component 206 may determine that the vehicle 102 has departed the first scheduled stop when the vehicle 102 has been outside of the first geofence 402 encompassing the first scheduled stop for a threshold period of time. For example, the vehicle 102 may be determined to have departed the first scheduled stop upon travelling to the fourth location 412 and remaining outside of the first geofence 402 for the threshold period of time. Similarly, the vehicle 102 may be determined to have departed the second scheduled stop upon travelling to the fifth location 414 and remaining outside of the second geofence 404 for the threshold period of time FIG. 5 is a flowchart showing a method 500 for route tracking overlapping geofences, according to some example embodiments. The method 500 may be embodied in computer readable instructions for execution by one or more processors such that the operations of the method 500 may be performed in part or in whole by the route management system 106;

accordingly, the method 500 is described below by way of example with reference thereto. However, it shall be appreciated that at least some of the operations of the method 500 may be deployed on various other hardware configurations and the method 500 is not intended to be limited to the route management system 106.

At operation 502, the tracking update component 308 updates a route tracking report to indicate that a vehicle 102 has arrived at a first scheduled stop. For example, the vehicle 102 may have been determined to have been withing a geofence encompassing the first schedules stop for a threshold period of time.

At operation 504, the geofence monitoring component 302 determines that the vehicle 102 has entered an overlapping portion of a geofence encompassing a second scheduled stop. The vehicle 102 is therefore within two different geofences that each encompass different scheduled stops along a route.

At operation 506, the time tracking component 304 tracks a period of time that the vehicle 102 has been within the geofence encompassing the second scheduled stop. The time tracking component 304 tracks the period of time that the vehicle 102 has been within the geofence encompassing the second scheduled stop even though the vehicle 102 has not yet departed the first scheduled stop.

At operation 508, the threshold comparison component 306 determines that the period of time meets a threshold period of time and the vehicle 102 has departed the first scheduled stop. The route tracking component 206 may determine that the vehicle 102 has departed the first scheduled stop in multiple ways, such as by prompting a vehicle operator for a status or determining that the vehicle 102 has left and remained outside of the geofence encompassing the first scheduled stop for a threshold period of time.

At operation 510, the tracking update component 308 updates the route tracking report to indicate that the vehicle 102 has arrived at the second scheduled stop.

Figure 6:
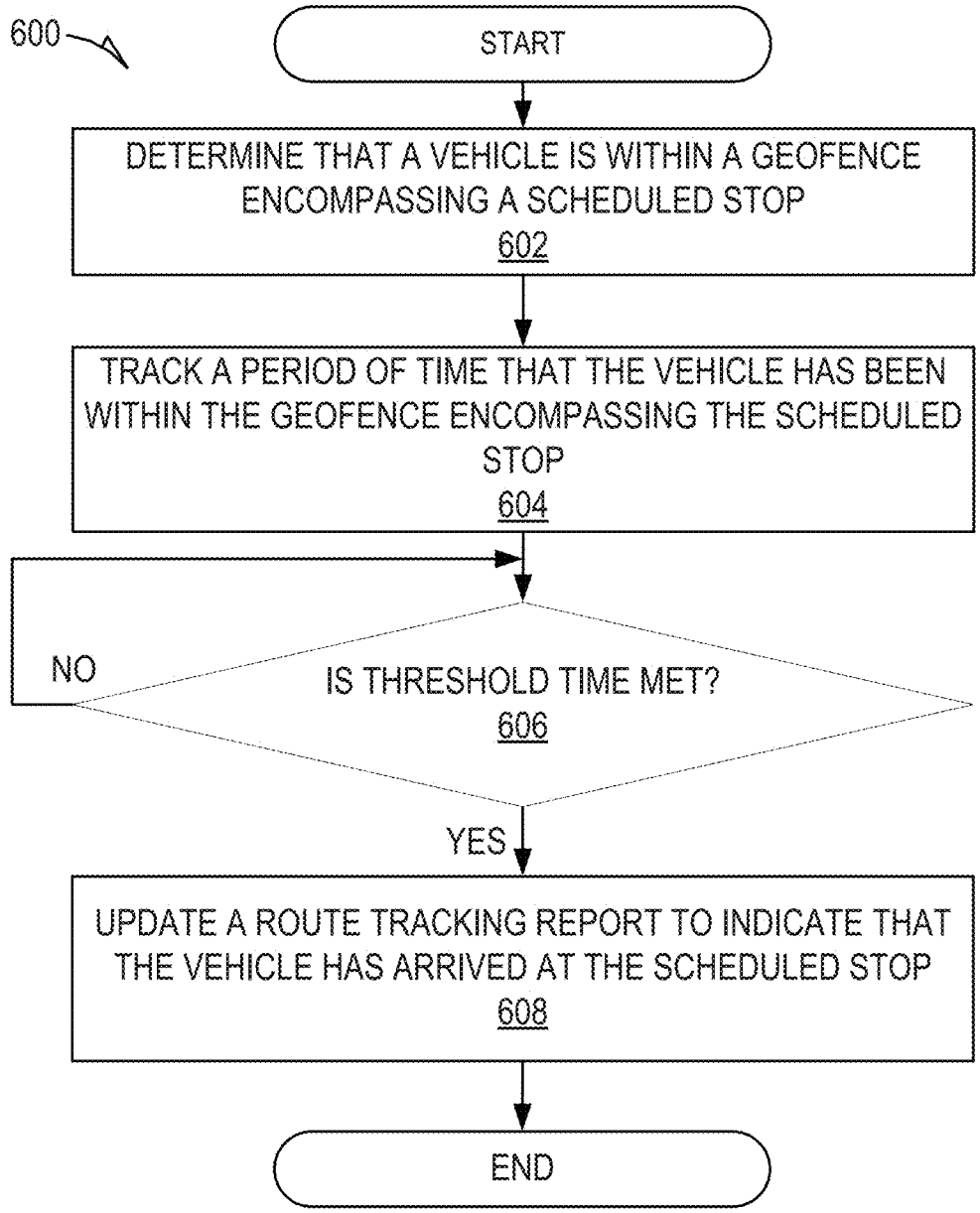
FIG. 6 is a flowchart showing a method for determining that a vehicle arrived at a scheduled stop, according to some example embodiments.

FIG. 6 is a flowchart showing a method 600 for determining that a vehicle 102 arrived at a scheduled stop, according to some example embodiments. The method 600 may be embodied in computer readable instructions for execution by one or more processors such that the operations of the method 600 may be performed in part or in whole by the route management system 106; accordingly, the method 600 is described below by way of example with reference thereto. However, it shall be appreciated that at least some of the operations of the method 600 may be deployed on various other hardware configurations and the method 600 is not intended to be limited to the route management system 106.

At operation 602, the geofence monitoring component 302 determines that a vehicle 102 is within a geofence encompassing a scheduled stop. For example, the geofence monitoring component 302 uses sensor data received by the sensor data receiving component 204 to determine the current location of the vehicle 102. The geofence monitoring component 302 accesses data from the data storage 212 that defines the schedule stops along a route assigned to the vehicle 102, as well as data defining the geofences encompassing the scheduled stops. The geofence monitoring component 302 uses this data to determine whether the current location of the vehicle 102 is within and/or outside of any geofences along a route assigned to the vehicle 102.

At operation 604, the time tracking component 304 tracks a period of time that the vehicle 102 has been within the geofence encompassing the scheduled stop. The period of time that the vehicle 102 has been within the geofence is used to determine whether the vehicle 102 has arrived from a scheduled stop encompassed by the geofence.

At operation 606, the threshold comparison component 306 determines whether a threshold period of time has been met. For example, the threshold comparison component 306 compares the period of time that the vehicle 102 has been within the geofence to a threshold period of time for determining that a vehicle 102 has arrived at a scheduled stop.

If the threshold comparison component 306 determines that the threshold period of time has been met, at operation 608, the tracking update component 308 updates a route tracking report to indicate that the vehicle 102 has arrived at the scheduled stop. For example, the threshold comparison component 306 provides the tracking update component 308 with data identifying the vehicle 102 and the geofence. In turn, the tracking update component 308 updates the route tracking report generation component 208 that the vehicle 102 has arrived at the scheduled stop encompassed by the geofence.

Figure 7:
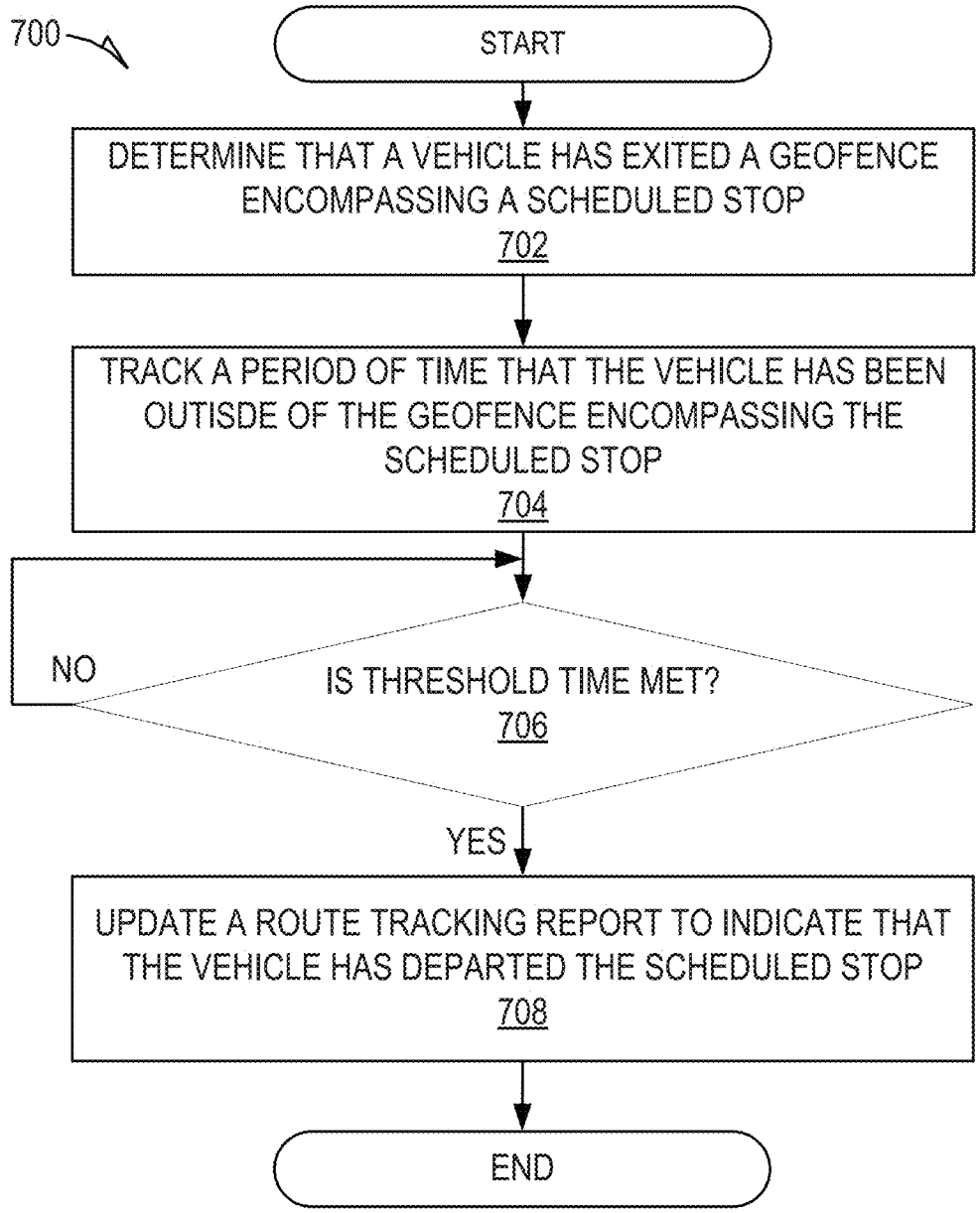
FIG. 7 is a flowchart showing a method for determining that a vehicle has departed from a scheduled stop, according to some example embodiments.

FIG. 7 is a flowchart showing a method 700 for determining that a vehicle 102 has departed from a scheduled stop, according to some example embodiments. The method 700 may be embodied in computer readable instructions for execution by one or more processors such that the operations of the method 700 may be performed in part or in whole by the route management system 106; accordingly, the method 700 is described below by way of example with reference thereto. However, it shall be appreciated that at least some of the operations of the method 700 may be deployed on various other hardware configurations and the method 700 is not intended to be limited to the route management system 106.

At operation 702, the geofence monitoring component 302 determines that a vehicle 102 has exited a geofence encompassing a scheduled stop. For example, the geofence monitoring component 302 uses sensor data received by the sensor data receiving component 204 to determine the current location of the vehicle 102. The geofence monitoring component 302 accesses data from the data storage 212 that defines the schedule stops along a route assigned to the vehicle 102, as well as data defining the geofences encompassing the scheduled stops. The geofence monitoring component 302 uses this data to determine whether the current location of the vehicle 102 is within and/or outside of any geofences along a route assigned to the vehicle 102.

At operation 704, the time tracking component 304 tracks a period of time that the vehicle 102 has been outside of the geofence encompassing the scheduled stop. The period of time that the vehicle 102 has been outside the geofence is used to determine whether the vehicle 102 has departed from the scheduled stop encompassed by the geofence.

At operation 706, the threshold comparison component 306 determines whether a threshold period of time has been met. For example, the threshold comparison component 306 compares the period of time that the vehicle 102 has been outside of the geofence to a threshold period of time for determining that a vehicle 102 has departed the scheduled stop.

If the threshold comparison component 306 determines that the threshold period of time has been met, at operation 708, the tracking update component 308 updates a route tracking report to indicate that the vehicle 102 has departed the scheduled stop. For example, the threshold comparison component 306 provides the tracking update component 308 with data identifying the vehicle 102 and the geofence. In turn, the tracking update component 308 updates the route tracking report generation component 208 that the vehicle 102 has departed the scheduled stop encompassed by the geofence.

Figure 8:
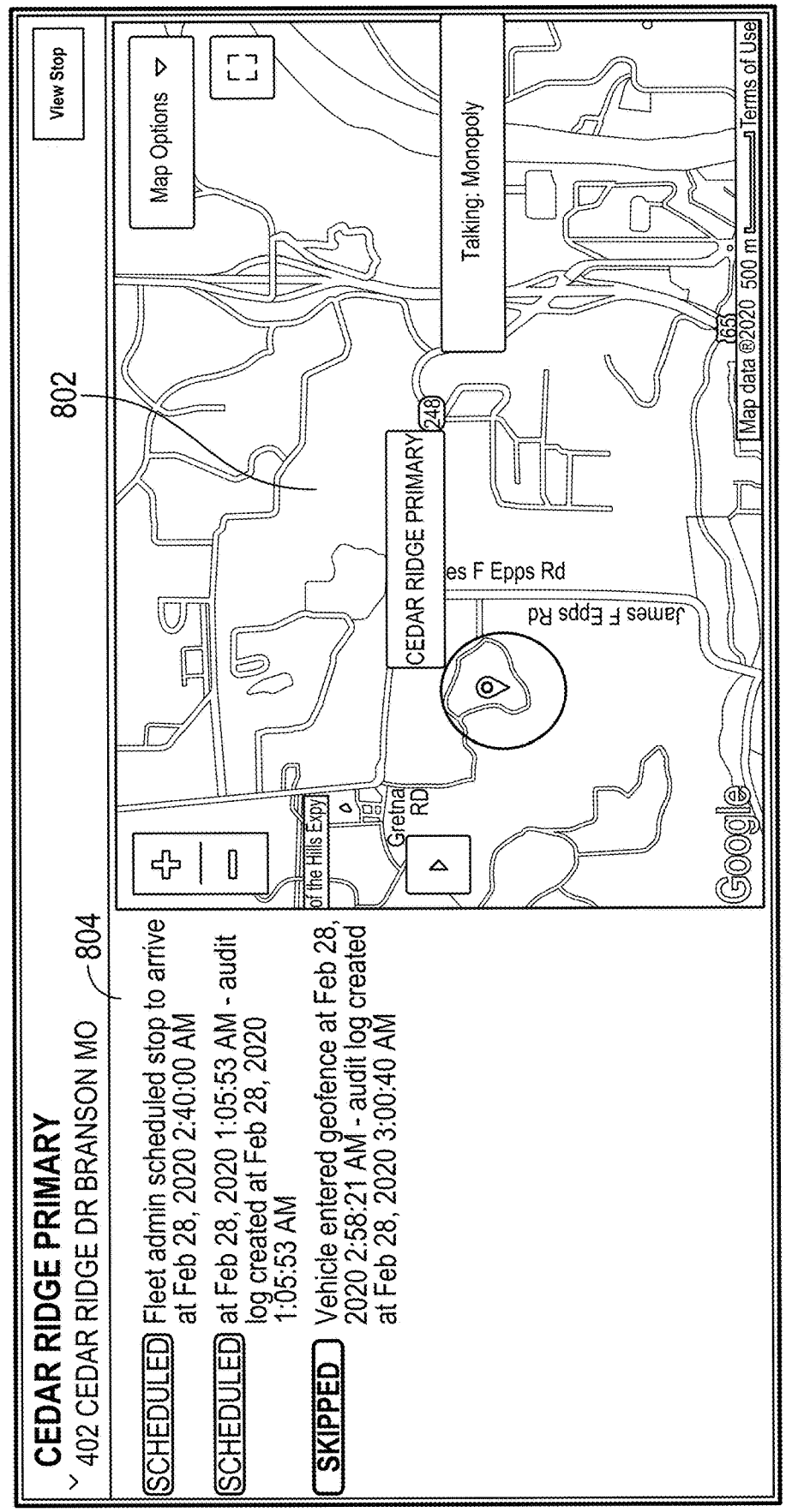
FIG. 8 shows a route tracking report, according to some example embodiments.

FIG. 8 shows a route tracking report 800, according to some example embodiments. As shown, the route tracking report 800 includes a map view 802 that tracks the movement of the vehicle 102 along the route. The route tracking report also includes a list of scheduled stops 804. Each scheduled stop in the list of scheduled stops 804 provides a current status and additional information. For example, the list of scheduled stops 804 indicates that the vehicle operator skipped one of the scheduled stops.

Software Architecture

Figure 9:
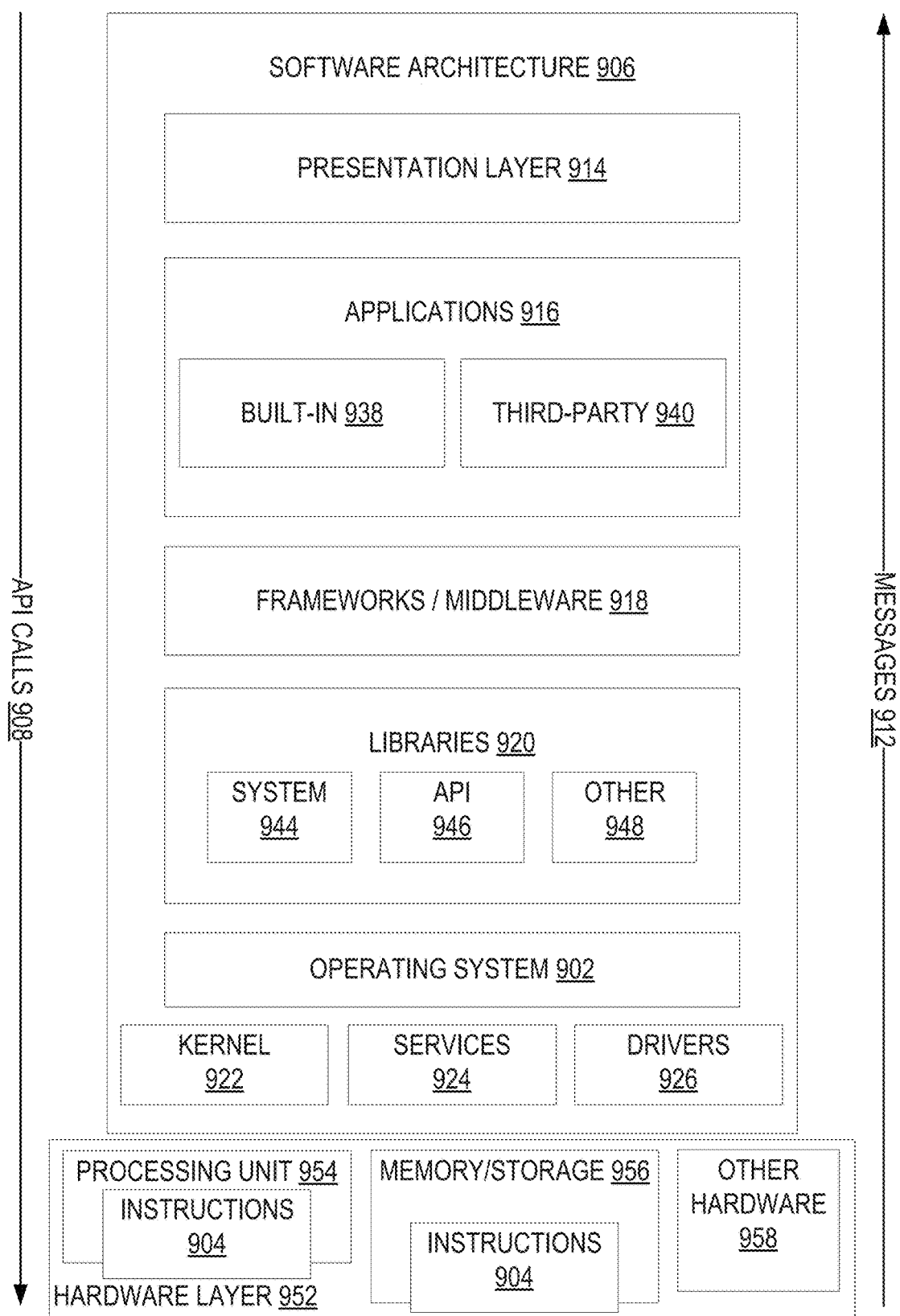
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
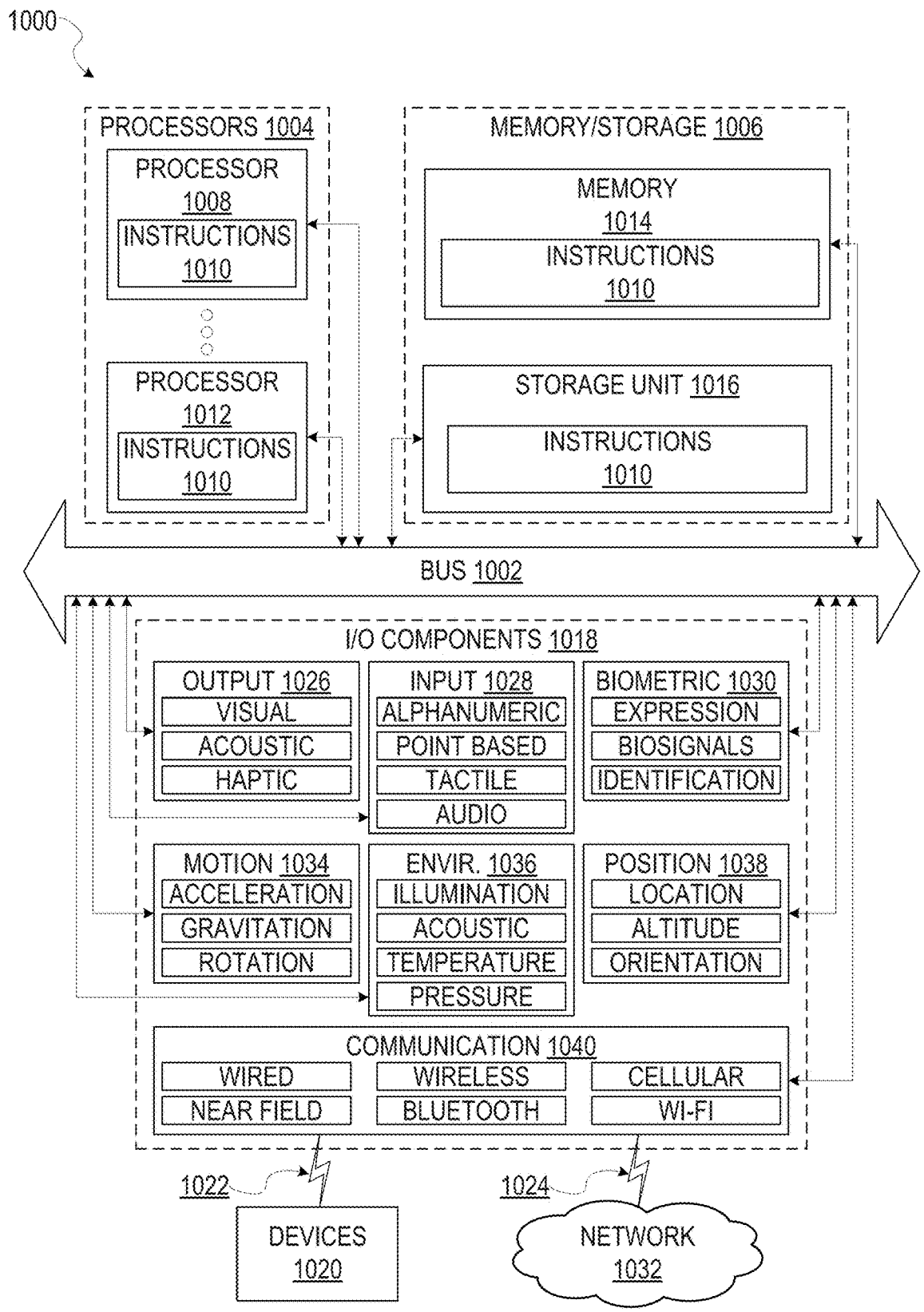
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), World-wide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLS™ are well-suited for the classification, processing, and prediction of time series, given time lags of unknown size and duration between events.

What is claimed is:

1. A method comprising:
  accessing a route tracking report associated with a vehicle along a first route, the first route including a first scheduled stop encompassed by a first geofence and a second scheduled stop encompassed by a second geofence, the first geofence and the second geofence overlapping with each other at a region along the first route,
  based on a determination that the vehicle has been within the first geofence for a first threshold period of time, updating the route tracking report to indicate that the vehicle has arrived at the first scheduled stop;
  determining that the vehicle has entered the region where the second geofence overlaps with the first geofence;
  in response to determining that the vehicle has entered the region where the second geofence overlaps with the first geofence, tracking a period of time that has elapsed from the vehicle entering the region;
  determining that the vehicle has departed the first scheduled stop; and
  in response to determining that the period of time that has elapsed from the vehicle entering the region meets the first threshold period of time and that the vehicle has departed the first scheduled stop, updating the route tracking report associated with the vehicle to indicate that the vehicle has arrived at the second scheduled stop along the first route.

2. The method of claim 1, further comprising: updating the route tracking report to indicate the vehicle has departed the first scheduled stop.

3. The method of claim 1, further comprising:
  determining that the vehicle has entered a portion of a third geofence that overlaps with the first geofence and the second geofence, the third geofence encompassing a third scheduled stop along the first route;
  in response to determining that the vehicle has entered the portion of a third geofence that overlaps with the first geofence and second geofence, tracking a second period of time that has elapsed from the vehicle entering the portion of the third geofence; and
  in response to determining that the second period of time that has elapsed from the vehicle entering the portion of the third geofence meets the first threshold period of and the vehicle has departed the first geofence and the second geofence, updating the route tracking report associated with the vehicle to indicate that the vehicle has arrived at the third scheduled stop along the first route.

4. The method of claim 3, further comprising:
  updating the route tracking report to indicate the vehicle has departed the second scheduled stop.

5. The method of claim 1, wherein determining that the vehicle has departed the first scheduled stop comprises:
  determining that the vehicle has been outside of the first geofence for a second threshold period of time.

6. The method of claim 5, wherein the second threshold period of time is different than the first threshold period of time.

7. The method of claim 1, wherein determining that the vehicle has departed the first scheduled stop comprises:
  causing presentation of a prompt to an operator of the vehicle, the prompt requesting that the operator indicate whether the vehicle has departed the first scheduled stop; and
  receiving a response to the prompt, the response indicating that the vehicle has departed the first scheduled stop.

8. A route management system comprising:
  one or more computer processors; and
  one or more computer-readable mediums storing instructions that, when executed by the one or more computer processors, cause the route management system to perform operations comprising:
  accessing a route tracking report associated with a vehicle along a first route, the first route including a first scheduled stop encompassed by a first geofence and a second scheduled stop encompassed by a second geofence, the first geofence and the second geofence overlapping with each other at a region along the first route;
  based on a determination that the vehicle has been within the first geofence for a first threshold period of time updating the route tracking report to indicate that the vehicle has arrived at the first scheduled stop;
  determining that the vehicle has entered the region where the second geofence overlaps with the first geofence;
  in response to determining that the vehicle has entered the region where the second geofence overlaps with the first geofence, tracking a period of time that has elapsed from the vehicle entering the region;
  determining that the vehicle has departed the first scheduled stop; and
  in response to determining that the period of time that has elapsed from the vehicle entering the region meets the first threshold period of time and that the vehicle has departed the first scheduled stop, updating the route tracking report associated with the vehicle to indicate that the vehicle has arrived at the second scheduled stop along the first route.

9. The route management system of claim 8, the operations further comprising:
updating the route tracking report to indicate the vehicle has departed the first scheduled stop.

10. The route management system of claim 8, the operations further comprising:
determining that the vehicle has entered a portion of a third geofence that overlaps with the first geofence and the second geofence, the third geofence encompassing a third scheduled stop along the first route;
in response to determining that the vehicle has entered the portion of a third geofence that overlaps with the first geofence and second geofence, tracking a second period of time that has elapsed from the vehicle entering the portion of the third geofence; and
in response to determining that the second period of time that has elapsed from the vehicle entering the portion of the third geofence meets the first threshold period of and the vehicle has departed the first geofence and the second geofence, updating the route tracking report associated with the vehicle to indicate that the vehicle has arrived at the third scheduled stop along the first route.

11. The route management system of claim 10, the operations further comprising:
updating the route tracking report to indicate the vehicle has departed the second scheduled stop.

12. The route management system of claim 8, wherein determining that the vehicle has departed the first scheduled stop comprises:
determining that the vehicle has been outside of the first geofence for a second threshold period of time.

13. The route management system of claim 12, wherein the second threshold period of time is different than the first threshold period of time.

14. The route management system of claim 8, wherein determining that the vehicle has departed the first scheduled stop comprises:
causing presentation of a prompt to an operator of the vehicle, the prompt requesting that the operator indicate whether the vehicle has departed the first scheduled stop; and
receiving a response to the prompt, the response indicating that the vehicle has departed the first scheduled stop.

15. A non-transitory computer-readable medium storing instructions that, when executed by one or more computer processors of a route management system, cause the route management system to perform operations comprising:
accessing a route tracking report associated with a vehicle along a first route, the first route including a first scheduled stop encompassed by a first geofence and a second scheduled stop encompassed by a second geofence, the first geofence and the second geofence overlapping with each other at a region along the first route;
based on a determination that the vehicle has been within the first geofence for a first threshold period of time updating the route tracking report to indicate that the vehicle has arrived at the first scheduled stop;
determining that the vehicle has entered the region where the second geofence overlaps with the first geofence;
in response to determining that the vehicle has entered the region where the second geofence overlaps with the first geofence, tracking a period of time that has elapsed from the vehicle entering the region;
determining that the vehicle has departed the first scheduled stop; and
in response to determining that the period of time that has elapsed from the vehicle entering the region meets the first threshold period of time and that the vehicle has departed the first scheduled stop, updating the route tracking report associated with the vehicle to indicate that the vehicle has arrived at the second scheduled stop along the first route.

16. The non-transitory computer-readable medium of claim 15, the operations further comprising:
updating the route tracking report to indicate the vehicle has departed the first scheduled stop.

17. The non-transitory computer-readable medium of claim 15, the operations further comprising:
determining that the vehicle has entered a portion of a third geofence that overlaps with the first geofence and the second geofence, the third geofence encompassing a third scheduled stop along the first route;
in response to determining that the vehicle has entered the portion of a third geofence that overlaps with the first geofence and second geofence, tracking a second period of time that has elapsed from the vehicle entering the portion of the third geofence; and
in response to determining that the second period of time that has elapsed from the vehicle entering the portion of the third geofence meets the first threshold period of and the vehicle has departed the first geofence and the second geofence, updating the route tracking report associated with the vehicle to indicate that the vehicle has arrived at the third scheduled stop along the first route.

18. The non-transitory computer-readable medium of claim 17, the operations further comprising:
updating the route tracking report to indicate the vehicle has departed the second scheduled stop.

19. The non-transitory computer-readable medium of claim 15, wherein determining that the vehicle has departed the first scheduled stop comprises:
determining that the vehicle has been outside of the first geofence for a second threshold period of time, the second threshold period of time being different than the first threshold period of time.

20. The non-transitory computer-readable medium of claim 15, wherein determining that the vehicle has departed the first scheduled stop comprises:
causing presentation of a prompt to an operator of the vehicle, the prompt requesting that the operator indicate whether the vehicle has departed the first scheduled stop; and
receiving a response to the prompt, the response indicating that the vehicle has departed the first scheduled stop.

* * * * *

UNITED STATES PATENT AND TRADEMARK OFFICE
CERTIFICATE OF CORRECTION

PATENT NO. : 12,170,931 B1
APPLICATION NO. : 17/647795
DATED : December 17, 2024
INVENTOR(S) : Nanda et al.

It is certified that error appears in the above-identified patent and that said Letters Patent is hereby corrected as shown below:

In the Claims

In Column 25, Line 48, in Claim 1, delete "route," and insert --route;-- therefor In Column 26, Line 1, in Claim 2, after "comprising:", insert a linebreak In Column 26, Line 55, in Claim 8, after "time", insert --,--

In Column 27, Line 63, in Claim 15, after "time", insert --,--

Signed and Sealed this
Third Day of June, 2025

Coke Morgan Stewart
*Acting Director of the United States Patent and Trademark Office*